Nov. 27, 1956     A. B. MANUPELLO     2,771,941
TIRE BEAD BREAKER WITH RIM CLAMPING MEANS
Filed Jan. 15, 1954     2 Sheets-Sheet 1
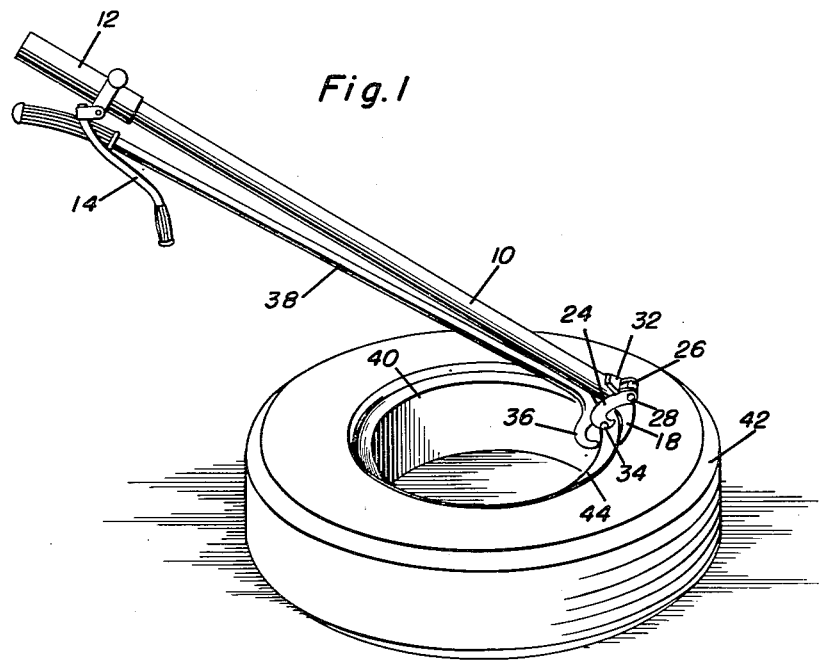
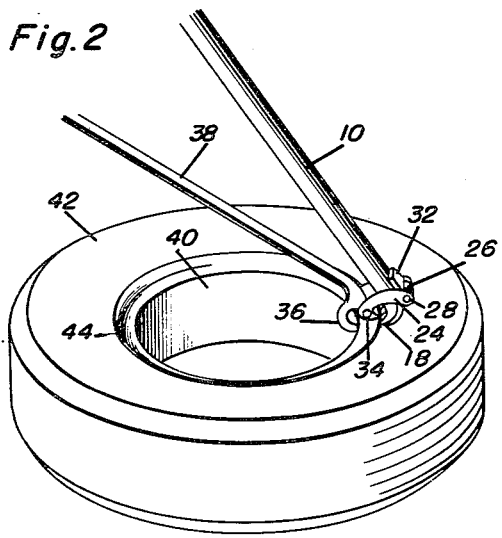
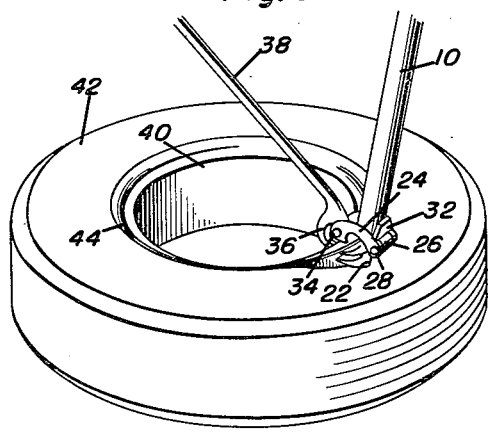
Anthony B. Manupello
INVENTOR.

Nov. 27, 1956   A. B. MANUPELLO   2,771,941
TIRE BEAD BREAKER WITH RIM CLAMPING MEANS
Filed Jan. 15, 1954   2 Sheets-Sheet 2
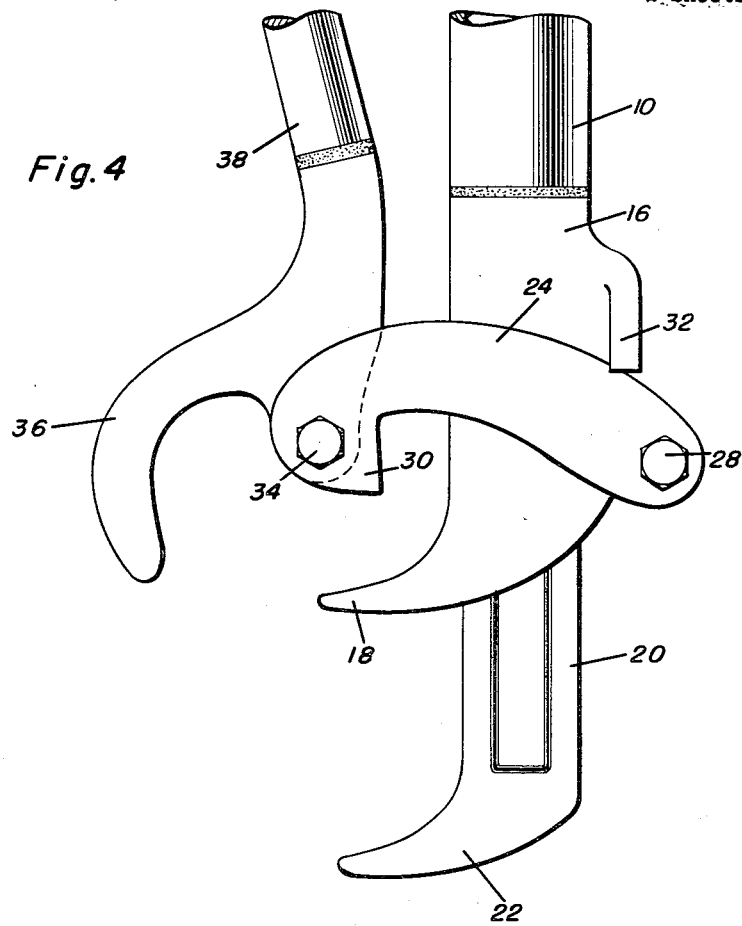
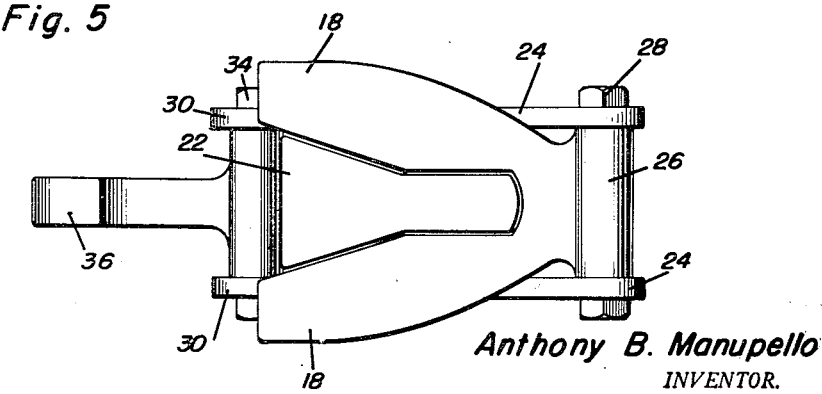
Anthony B. Manupello
INVENTOR.

United States Patent Office 2,771,941
Patented Nov. 27, 1956

2,771,941

TIRE BEAD BREAKER WITH RIM CLAMPING MEANS

Anthony B. Manupello, Penns Grove, N. J.

Application January 15, 1954, Serial No. 404,333

1 Claim. (Cl. 157—1.17)

This invention relates to a tire demounter, and more particularly to an improvement on the tire demounter disclosed in Patent No. 2,606,602.

It is an object of this invention to provide a pneumatic tool for removing a tire from its rim which does away with the use of tire irons and the hazards incident to the use thereof.

A further object of this invention is to provide an improved locking means of securing a pneumatic tire demounter on the rim of a wheel to prevent the tire demounter from slipping during use.

Another object of this invention is to provide an improved locking means for securing a tire demounter on the rim of a wheel, which is simple and efficient in construction, and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the improved tire demounter forming the subject of this invention placed in position on the rim of a wheel at the side of the tire demounting operation;

Figure 2 is a perspective view showing the tire demounter mounted on the rim of a wheel with the auxiliary hook in released position;

Figure 3 is a perspective view showing the tire demounter locked in position on the rim and with the casing of the tire broken away from the rim;

Figure 4 is a side elevational view in enlarged detail of the locking means secured to the tire demounting tool; and Figure 5 is a bottom plan view of the improved tire demounter forming the subject of this invention.

Referring now more specifically to the accompanying drawings, it will be seen that the improved tire demounter forming the subject of this invention, includes an elongated tubular housing 10 having a hydraulic unit 12 secured to one end thereof. A handle 14 is secured to the hydraulic unit 12 and operatively connected thereto for actuating the same. The other end of the housing 10 is provided with a foot portion 16 having a pair of spaced parallel fingers 18 extending from one side thereof transverse to the longitudinal axis of the housing 10. Slidably disposed within the housing 10 is a ram 20 having a finger 22 secured to one end thereof and disposed between the fingers 18 on the foot portion 16. The other end of the ram 20 is secured to the hydraulic unit 12 whereby the ram 20 may be moved longitudinally within the housing 10 to force the finger 22 longitudinally away from the fingers 18.

The above structure is similar in construction and operation to that in my Patent No. 2,606,602.

Means are provided on the foot portion 16 for securing the tire demounting tool on the rim of a wheel. This means comprises a pair of members 24 secured to the foot portion 16 on the side of the foot portion 16 opposite to the direction in which the fingers 18 extend. The foot portion 16 is provided with an ear 26 which extends therefrom in the direction opposite the extent of fingers 18 and a fastener 28 extends through the ear 26 for pivotally securing the members 24 thereto. The members 24 are positioned on opposite sides of the foot portion 16 and extend in the same direction as the fingers 18. The members 24 terminate in hook portions 30 which overlie the ends of fingers 18. The members 24 are free to move toward and away from the fingers 18 and a stop 32 is secured to the foot portion 16 and engages the members 24 for limiting the movement of the members 24 away from the fingers 18.

A fastener 34 extends between the hook portions 30 of the members 24. The fastener 34 is spaced from the foot portion 16. Pivotally secured on the fastener 34 is a hook positioning member 36. This hook positioning member 36 extends in the same direction as the hook portions 30 on members 24 and is spaced outwardly from the free ends of the fingers 18. An elongated handle 38 is secured to the hook positioning member 36 for actuating the hook positioning member.

In practical use of the device, the tire demounter is positioned as shown in Figure 1 with the hoop positioning member 36 engaging the inner face of a tire rim and with the fingers 18 and 22 engaging the bead of the tire 42 adjacent the flange 44 on the rim. The hook positioning member provides means for positioning the device so that the hook portions 30 can be engaged with the flange on the rim of a wheel. The handle 38 is held in position while the housing 10 is moved toward a vertical position. As the housing 10 pivots about fastener 34, the hook portion 30 engages the flange on the rim and the fingers 18 and 22 are forced between the bead and the rim. As the device approaches the position shown in Figure 2, the hook portions 30 engage the flange and the hook positioning member 36 is then free. Continued movement of the housing 10 forces the fingers 18 and 22 between the bead of the tire and the flange. When the tool is in the position shown in Figure 3, the handle 14 is actuated to force the finger 22 from between the fingers 18. This will cause the tire bead to break away from the flange. At this time, the hook portion 30 retains the tire demounting tool in position on the rim. Pressure may be maintained on the handle 38 to aid in retaining the tire demounting tool in position. The stop 32 limits the upward movement of the members 24 to maintain these members in position.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A tire demounting tool comprising an elongated housing, a pair of spaced parallel fingers secured to one end of said housing and extending from one side thereof substantially transverse to the longitudinal axis of said housing, a ram slidably mounted in said housing, means mounted on the other end of said housing and connected to said ram for urging said ram longitudinally in said housing, a finger on said ram extending parallel to and positioned between said first named fingers, locking means mounted adjacent said one end of said housing for securing the tool in position on a wheel or rim, said locking means including a pair of members pivotally secured at one of their ends to said housing on the side opposite to the direction in which said fingers extend, said members extending in the same direction as said fingers and having a hook portion provided on the other end thereof and overlying said fingers, and a stop member fixedly secured to said housing, said stop member limiting the movement of said members away from said fingers, a hook positioning lever pivotally connected intermediate its ends to said members adjacent the hook portion thereof and spaced from the housing, one end of said lever having a rim-engaging portion, the other end constituting a handle whereby said rim-engaging portion can be positioned against the inner face of the rim and said handle actuated to draw said hook portion into locking position with said rim and said fingers between the flange of said rim and the bead of the tire.

References Cited in the file of this patent

UNITED STATES PATENTS

| | | |
|---|---|---|
| 2,293,467 | Kenworthy | Aug. 18, 1942 |
| 2,314,127 | Colley et al. | Mar. 16, 1943 |
| 2,317,072 | Martin | Apr. 20, 1943 |
| 2,367,638 | McCulloch | Jan. 16, 1945 |
| 2,495,117 | McCollester | Jan. 17, 1950 |
| 2,538,962 | Branick | Jan. 23, 1951 |
| 2,606,602 | Manupello | Aug. 12, 1952 |
| 2,682,298 | Manupello | June 29, 1954 |

FOREIGN PATENTS

| | | |
|---|---|---|
| 893,455 | Germany | Oct. 15, 1953 |